United States Patent
Nuding et al.

(10) Patent No.: US 7,251,923 B2
(45) Date of Patent: Aug. 7, 2007

(54) CHAIN LOCK

(75) Inventors: Andreas Nuding, Geislingen (DE); Werner Lang, Westhausen-Lippach (DE); Hans Dalferth, Aalen-Wasseralfingen (DE)

(73) Assignee: RUD-Kettenfabrik Rieger & Dietz GmbH. u. Co., Aalen - Unterkochen (DE)

( * ) Notice: Subject to any disclaimer, the term of this patent is extended or adjusted under 35 U.S.C. 154(b) by 6 days.

(21) Appl. No.: 10/554,563

(22) PCT Filed: Apr. 28, 2004

(86) PCT No.: PCT/DE2004/000922

§ 371 (c)(1),
(2), (4) Date: Oct. 25, 2005

(87) PCT Pub. No.: WO2004/097253

PCT Pub. Date: Nov. 11, 2004

(65) Prior Publication Data

US 2006/0266015 A1   Nov. 30, 2006

(30) Foreign Application Priority Data

May 2, 2003    (DE) ............................... 103 20 693

(51) Int. Cl.
*F16G 15/04*    (2006.01)

(52) U.S. Cl. .................................... 59/85; 59/87; 59/93
(58) Field of Classification Search ............... 59/85, 59/87, 93
See application file for complete search history.

(56) References Cited

U.S. PATENT DOCUMENTS

| 4,090,357 | A  | * | 5/1978 | Smith ............................. 59/85 |
| 6,021,634 | A  | * | 2/2000 | Brodziak ....................... 59/85 |
| 6,223,517 | B1 | * | 5/2001 | Bogdan et al. ................ 59/85 |
| 7,024,849 | B2 | * | 4/2006 | Benecke et al. ............... 59/85 |

FOREIGN PATENT DOCUMENTS

| DE | 8320392  | 8/1983 |
| DE | 29811332 | 9/1998 |
| FR | 2333170  | 6/1977 |

* cited by examiner

*Primary Examiner*—David B Jones
(74) *Attorney, Agent, or Firm*—Mark P. Stone

(57) ABSTRACT

A chain lock has two lock parts (1) which can be displaced in the longitudinal direction of the lock in order to open and close the lock. Each lock part (1) has a journal (5) which is arranged on one end and a pocket (6) which is arranged on the other end. The journal (5) of one lock part (1) fits, respectively, into the pocket (6) of the other lock part (1). The journals (5) and the pockets (6) are both similar in height (H) to the inner width of the lock and each journal (5) has several retaining frames (7, 8), associated with several retaining grooves (13, 14) in the pocket (6) of the other lock part (1).

20 Claims, 2 Drawing Sheets

CHAIN LOCK

TECHNICAL FIELD

The invention relates to a chain lock for link chains having two lock parts which can be displaced by limited amounts with respect to each other in the longitudinal direction of the lock in order to open and close the lock and in each case have two ends which are connected to each other via a longitudinal web and of which in each case one forms a stud having a retaining web extending over part of the circumference of the stud and in each case one is provided with a recess serving to receive the stud and having a retaining groove for the retaining web.

PRIOR ART

A chain lock of the above type is disclosed in DE 199 14 014 C2. In the case of the known chain lock, the retaining stud is provided, as in the case of other similar chain locks known, for example, from DE patent 23 54 028, with an individual retaining web and an individual retaining groove assigned to the retaining web, the supporting surface of the retaining web, which supporting surface serves to transmit transverse forces, and the mating surface of the retaining groove, which mating surface interacts with said supporting surface, being situated essentially in the longitudinal central plane of the lock. As has been shown in practice, with increasing static and dynamic loading, the retaining web is the part of the chain lock which is subjected to the greatest amount of stress. Taking account of this circumstance, it has been proposed in DE 26 38 443 C3 to design the retaining webs and retaining grooves in a beveled manner in order thereby to obtain an increase of the cross section of the retaining stud. However, a noticeable improvement of the strength cannot be achieved in this manner even if, following the teaching of DE 77 05 179 U, the connecting point—as is conclusive per se—is arranged in a region of the chain link ends, over the cross section of which the local distribution of stress is more balanced. The reason for the success sought failing to materialize may be found in the fact that due to the beveled position of the retaining web and the retaining groove, the portion of tensile forces which are to be absorbed by that end of the retaining web which is directed toward the interior of the lock takes on values which lead to the retaining web tearing off in the above mentioned region.

SUMMARY OF THE INVENTION

The invention is based on the object, in the case of a chain lock of the generic type under consideration, of obtaining an increase in the static and dynamic stress by means of an optimized distribution of the forces and stresses occurring under load in the lock. The object set is achieved according to the invention by the fact that the height of the stud and of the recess is essentially equal to the inner width of the lock, and by the fact that the stud has a plurality of retaining webs and the recess has a plurality of retaining grooves.

The multistage design of the studs and recesses and the selection of a greater height of the studs and recesses in comparison to the known constructions leads to a balanced and favorable distribution of the stresses and, in particular, of the transverse forces in the coupling region of the lock parts and, as a result, makes the sought increase in strength possible.

Further features and details of the invention emerge from the subclaims and the description below of a particularly advantageous embodiment of the invention which is illustrated in the accompanying drawings.

WAYS OF IMPLEMENTING THE INVENTION

Figure 7:
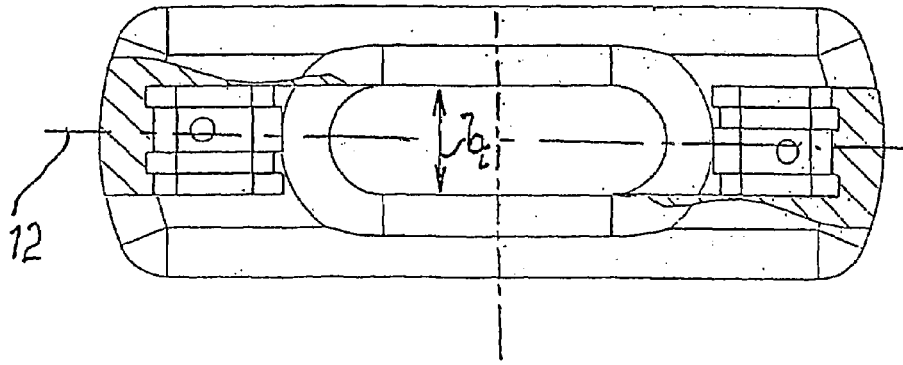
FIG. 7 shows the lock parts according to FIG. 5 in their end position.

The lock part 1 illustrated in FIGS. 1 to 4 has two ends 3 and 4 which are connected via a longitudinal limb 2 and of which the end 3 is provided with a stud 5 and the end 4 is provided with a recess 6 for receiving the stud 5. The stud 5 is provided with two retaining webs 7 and 8 which protrude over their entire length approximately 2 to 6 mm above the neck-shaped sections 9 and 10 of the stud 5. The height H of the stud 5 corresponds essentially to the inner width $b_i$ of the fitted chain lock (cf. FIGS. 2 and 7). The use of a stud 5 with just two retaining webs 7, 8 has proven expedient, especially in the case of smaller and medium lock sizes, not least for economic considerations.

The distance a between the retaining webs 7, 8 is larger than the width $b_s$ of the retaining webs 7, 8. Owing to the comparatively large distance a between the retaining webs 7, 8, there is sufficient space for providing a transverse hole 11 for receiving a securing pin (not illustrated in the drawing). Those curved sections of the retaining webs 7, 8 which are at the greatest risk of fracturing under load are situated in regions positioned outside the longitudinal central plane 12, i.e. in zones in which the transverse forces acting on the retaining webs 7, 8 are lower than in the longitudinal central plane.

The recess 6 serving to receive the stud 5 of a second lock part 1 has retaining grooves 13, 14, the width $b_n$ of which corresponds essentially to the width $b_s$ of the retaining webs 7, 8, i.e. in the same manner as the distance a' between the retaining grooves 13, 14, $b_n$ is only a little larger than the width $b_s$ or the distance a, so that, in the fitted state of the chain lock, a virtually play-free connection between the studs and the recesses can be assumed. In the region of the section 15 of the recess 6 a transverse hole 16 is provided which, in the fitted state of the lock, is aligned with the transverse hole 11 of a stud 5 introduced into the recess 6.

Both the stud 5 and the recess 6 have a cross section which widens toward the interior of the lock part 1. As is apparent from FIG. 4, the flanks of the stud 5 and the inner walls of the recess 6 enclose an angle a between them. This angle α is preferably 10 to 30°, but may also be smaller. The wedge-shaped design of the stud 5 and the matching shape of the recess 6 have proven advantageous in this respect because it makes it much easier to release the lock after a relatively long period of use and the formation of frictional corrosion which generally results from this; namely a comparatively light blow of the hammer against one of the lock parts is sufficient in order to separate them from each other.

Figure 1:
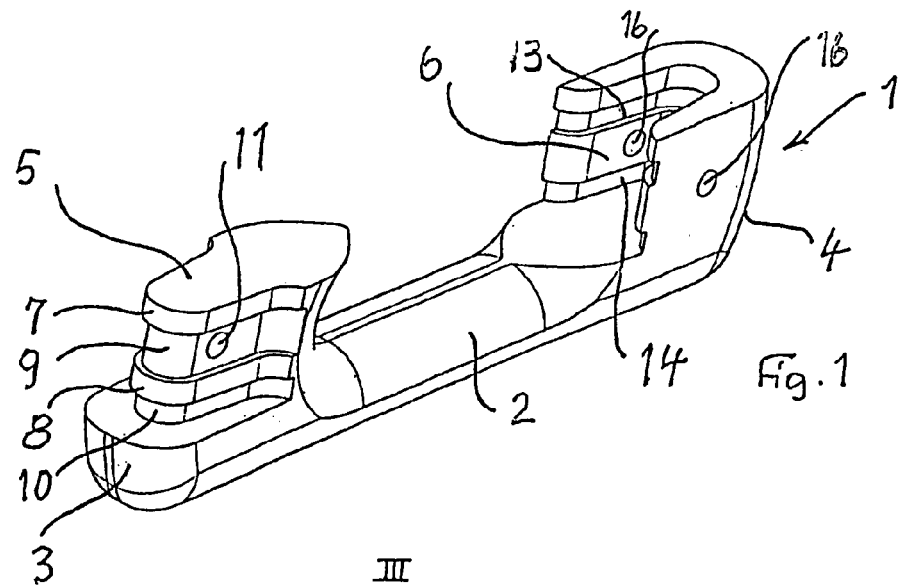
FIG. 1 shows the perspective view of one of two identical lock parts.
Figure 2:
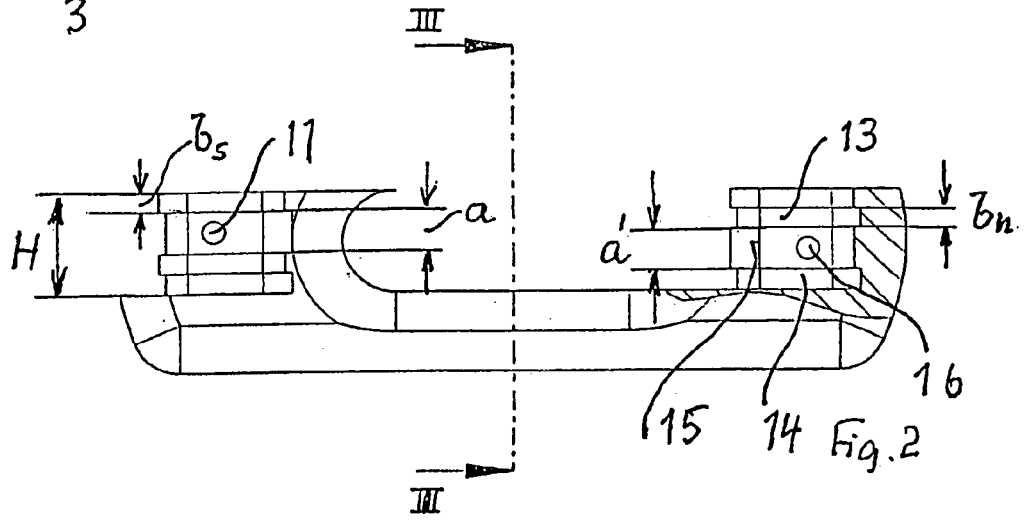
FIG. 2 shows, partially in section, the side view of the lock part according to FIG. 1.
Figure 3:
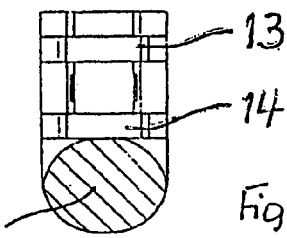
FIG. 3 shows a section along the line III-III in FIG. 2.
Figure 4:
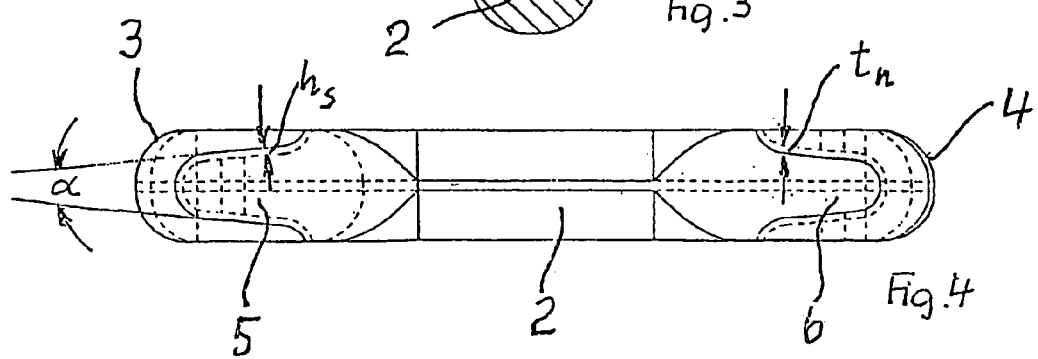
FIG. 4 shows the plan view of the lock part according to FIG. 2.
Figure 5:
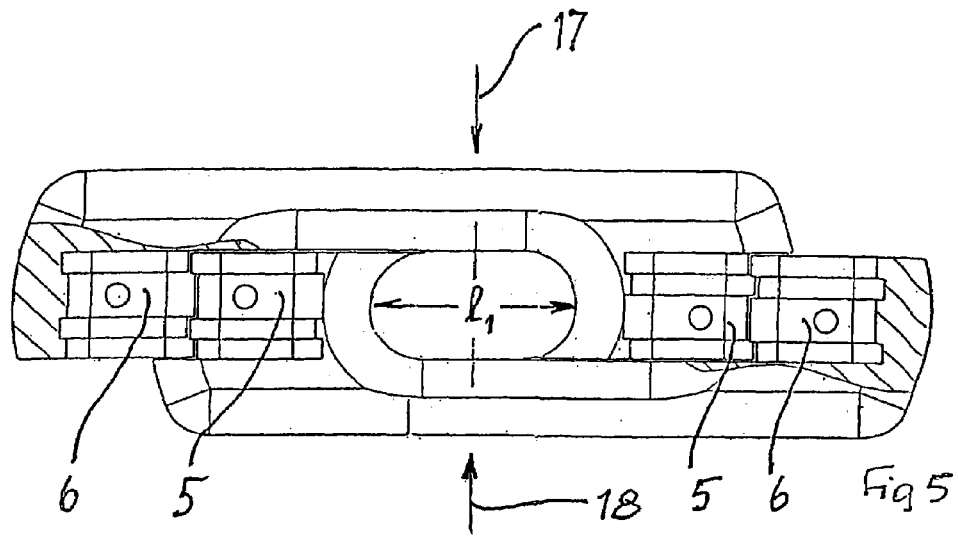
FIG. 5 shows two lock parts in a first position.
Figure 6:
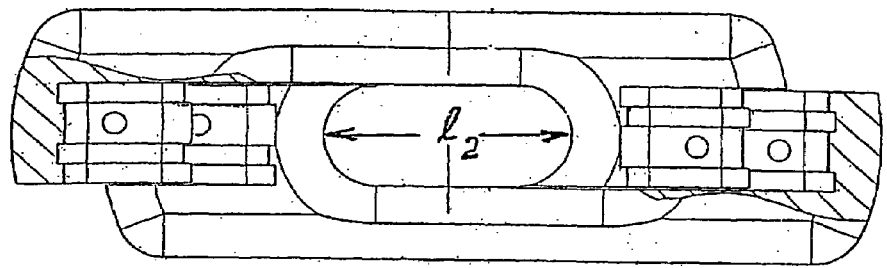
FIG. 6 shows the lock parts according to FIG. 5 in a second position.

The wedge shape also has a further positive effect which is explained with reference to FIGS. 5 and 6. FIG. 5 shows two identical lock parts in a position which they would have to assume during joining together in the direction of the arrows 17, 18 if the flanks of the studs 5 and the inner walls of the recesses 6 were to run parallel to one another. By contrast, the conditions can be seen in FIG. 6 which permit them to be joined together in the direction of the arrows 17, 18 on account of the wedge-shaped design of the stud 5 and of the recess 6. By means of the wedge-shaped design of the flanks of the stud and of the side walls of the recess, the dimension $l_1$ in FIG. 5 can be increased to a value $l_2$. This increase considerably facilitates the assembly of the lock in practice.

The invention claimed is:

1. A chain lock for link chains with two lock parts (1) which can be displaced by limited amounts with respect to each other in a longitudinal direction of the lock in order to open and close the lock, each lock part having opposed ends which are connected to each other via a longitudinal web (2), one of said opposed ends forming a stud (5) having a retaining web (7) extending over part of a circumference of the stud, and the other of said opposed ends being provided with a recess (6) for receiving the stud (5) and having a retaining groove (13) for the retaining web (7), characterized in that the stud (5) and the recess (6) have a height (H) which is equal to an inner width ($b_1$) of the lock, and in that the stud (5) has a plurality of said retaining webs (7, 8) arranged one above another, and the recess (6) has a plurality of said retaining grooves (13, 14) arranged one above another.

2. The chain lock as claimed in claim 1, characterized in that a distance (a and a', respectively) between the retaining webs (7, 8) and the retaining grooves (13, 14) is equal to a width ($b_s$ and $b_n$, respectively) of the retaining webs (7, 8) and the retaining grooves (13, 14).

3. The chain lock as claimed in claim 1, characterized in that a distance (a and a', respectively) between the retaining webs (7, 8) and the retaining grooves (13, 14) is larger than the width ($b_s$ and $b_n$, respectively) of the retaining webs (7, 8) and the retaining grooves (13, 14).

4. The chain lock as claimed in claim 1, characterized in that the stud (5) has two retaining webs (7, 8) and the recess (6) has two retaining grooves (13, 14).

5. The chain lock as claimed in claim 1, characterized in that the stud (5) and the recess (6) are provided with a respective transverse hole (11, 16) serving to receive a securing element, which can also be used for transmission of force.

6. The chain lock as claimed in claim 1, characterized in that the stud (5) and the recess (6) have a cross section which widens or expands continuously in the longitudinal direction of the lock.

7. The chain lock as claimed in claim 6, characterized in that the flanks of the retaining webs (7, 8) are wedge-shaped and that side wall sections of the retaining grooves (13, 14) which face the flanks of the retaining webs (7, 8) have a bevel corresponding to a wedge angle ($\alpha$) of the flanks of the retaining webs.

8. The chain lock as claimed in claim 1, characterized in that flanks of the stud (5) and side walls of the recess (6) enclose an angle ($\alpha$) of 10 to 30°.

9. The chain lock as claimed in claim 1, characterized in that the retaining grooves (13, 14) have a depth ($t_n$) of 2 to 6 mm, which receive the retaining webs (7, 8) essentially without play.

10. The chain lock as claimed in claim 1, characterized in that the retaining webs (7, 8) have a height which is approximately 2 to 6 mm.

11. A chain lock for link chains with two lock parts (1) which can be displaced by limited amounts with respect to each other in a longitudinal direction of the lock in order to open and close the lock, each lock part having opposed ends which are connected to each other via a longitudinal web (2), one of said opposed ends forming a stud (5) having a retaining web (7) extending over part of a circumference of the stud, and the other of said opposed ends being provided with a recess (6) for receiving the stud (5) and having a retaining groove (13) for the retaining web (7), characterized in that the stud (5) has a plurality of said retaining webs (7, 8) arranged one above another, and the recess (6) has a plurality of said retaining grooves (13, 14) arranged one above another.

12. The chain lock as claimed in claim 2, characterized in that the stud (5) has two retaining webs (7, 8) and the recess (6) has two retaining grooves (13, 14).

13. The chain lock as claimed in claim 3, characterized in that the stud (5) has two retaining webs (7, 8) and the recess (6) has two retaining grooves (13, 14).

14. The chain lock as claimed in claim 2, characterized in that the stud (5) and the recess (6) are provided with a respective transverse hole (11, 16) serving to receive a securing element, which can also be used for transmission of force.

15. The chain lock as claimed in claim 3, characterized in that the stud (5) and the recess (6) are provided with a respective transverse hole (11, 16) serving to receive a securing element, which can also be used for transmission of force.

16. The chain lock as claimed in claim 2, characterized in that the stud (5) and the recess (6) have a cross section which widens or expands continuously in the longitudinal direction of the lock.

17. The chain lock as claimed in claim 11, characterized in that a distance (a and a', respectively) between the retaining webs (7, 8) and the retaining grooves (13, 14) is equal to the width ($b_s$ and $b_n$, respectively) of the retaining webs (7, 8) and the retaining grooves (13, 14).

18. The chain lock as claimed in claim 11, characterized in that a distance (a and a', respectively) between the retaining webs (7, 8) and the retaining grooves (13, 14) is larger than the width ($b_s$ and $b_n$, respectively) of the retaining webs (7, 8) and the retaining grooves (13, 14).

19. The chain lock as claimed in claim 11, characterized in that the stud (5) has two retaining webs (7, 8) and the recess (6) has two retaining grooves (13, 14).

20. The chain lock as claimed in claim 11, characterized in that the stud (5) and the recess (6) are provided with a respective transverse hole (11, 16) serving to receive a securing element, which can also be used for transmission of force.

* * * * *